G. F. GREEN.
GRAIN-BINDER.

Patented March 6, 1877.

WITNESSES

Robert Everett
C. M. Searle

INVENTOR

George F. Green
Gilmore, Smith & Co.
ATTORNEYS

N. PETERS, PHOTO-LITHOGRAPHER, WASHINGTON, D. C.

G. F. GREEN.
GRAIN-BINDER.

Patented March 6, 1877.

WITNESSES
Robert Everett
C. R. Searle

INVENTOR
George F. Green
Gilmore Smith & Co.
ATTORNEYS

G. F. GREEN.
GRAIN-BINDER.

No. 188,125. Patented March 6, 1877.

WITNESSES
Robert Everett
C. R. Searle

INVENTOR
George F. Green
Gilmore, Smith & Co.
ATTORNEYS

G. F. GREEN.
GRAIN-BINDER.

No. 188,125. Patented March 6, 1877.

G. F. GREEN.
GRAIN-BINDER.

No. 188,125. Patented March 6, 1877.

WITNESSES
Robert Cravitt
C. M. Searle

INVENTOR
George F. Green
Gilmore Smith & Co.
ATTORNEYS

N. PETERS, PHOTO-LITHOGRAPHER, WASHINGTON, D. C.

G. F. GREEN.
GRAIN-BINDER.

No. 188,125. Patented March 6, 1877.

WITNESSES
Robert Evanitt
C. R. Searle

INVENTOR
George F. Green.
Gilmore, Smith & Co.
ATTORNEYS

N. PETERS, PHOTO-LITHOGRAPHER, WASHINGTON, D.C.

UNITED STATES PATENT OFFICE.

GEORGE F. GREEN, OF KALAMAZOO, MICHIGAN.

IMPROVEMENT IN GRAIN-BINDERS.

Specification forming part of Letters Patent No. 188,125, dated March 6, 1877; application filed May 5, 1876.

*To all whom it may concern:*

Be it known that I, GEORGE F. GREEN, of Kalamazoo, in the county of Kalamazoo and State of Michigan, have invented a new and valuable Improvement in Grain-Binding Harvesters; and I do hereby declare that the following is a full, clear, and exact description of the construction and operation of the same, reference being had to the annexed drawings, making a part of this specification, and to the letters and figures of reference marked thereon.

This invention has relation to means which are designed for binding grain automatically without the necessity of employing manual labor, and which is an attachment to harvesters.

Wire for binding grain is objectionable on account of serious difficulties growing out of the fact that portions of the wire are left in the straw during the operation of separating the bundles.

The main object of my invention is to automatically tie the bundles of grain with a string or cord, and to leave the bundles tight.

The nature of my invention consists, first and mainly, in mechanism which I shall hereinafter explain, which will automatically gage or regulate the size of the bundles of grain, whether the machine be cutting light or heavy grain, bind the bundles by means of a cord, and discharge the same from the machine, as will be hereinafter explained.

The invention further consists in novel means whereby a bundle of grain is compressed, and while compressed a cord is passed around it and tied automatically, leaving the bundle tightly compressed.

The invention further consists in intermittently-rotating dividing-arms, a vibrating divider, and a binding-arm, in combination with means which will tie a cord about a compressed bundle of grain, substantially as will be hereinafter explained.

My invention further consists in a shield, which is combined with a divider and a vibrating cord-carrying arm, whereby in the act of moving the cord to the tying devices a free space is formed for the passage of said arm.

My invention further consists in the employment of mechanism for tying the cord about the bundles, of griping-jaws, one pair of which is caused to rotate about a tube previous to the operation of the gripers, which grasp the cord and finish the tie.

Other features which I shall adopt in carrying my invention into effect will be understood from the following description:

In the annexed drawings, A designates a starting arm or lever, (indicated in Figs. 1, 2, and 9,) which has a cam, 2, on its under side that lifts a spring-latch, 3, (indicated in Figs. 2 and 8,) from a shoulder or catch, 4, (shown in Fig. 6,) thereby loosening the tube c on shaft m, so that the force exerted on lever A is transmitted through the tube c by means of a spring, D, to a crank, E, thereby actuating a bar, F, and bringing the sliding clutch 5 in contact with the clutching-face of a chain-wheel, G¹, (represented in Fig. 1,) giving motion to a crank and cam shaft, G, and transmitting motion to the binding devices, and depressing the toggle-levers H and L, and bringing down the binding-arm *i* with its cord 10, (shown in Fig. 1,) moving forward the divider K, also moving up the compressing-arms J, and also operating the knot-tying mechanism.

Figure 1:
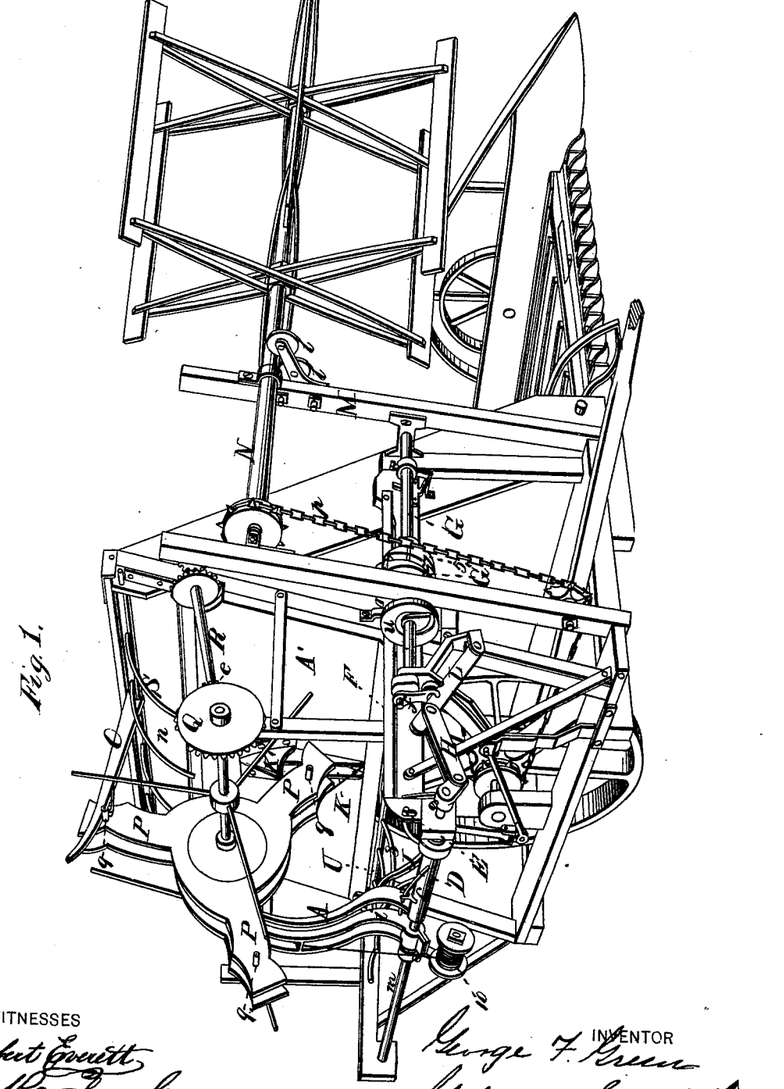
Figure 1 of the drawings is a representation of a perspective view of my grain-binder.
Figures 2, 3, 4, 5, 6, 7, 8, 9:
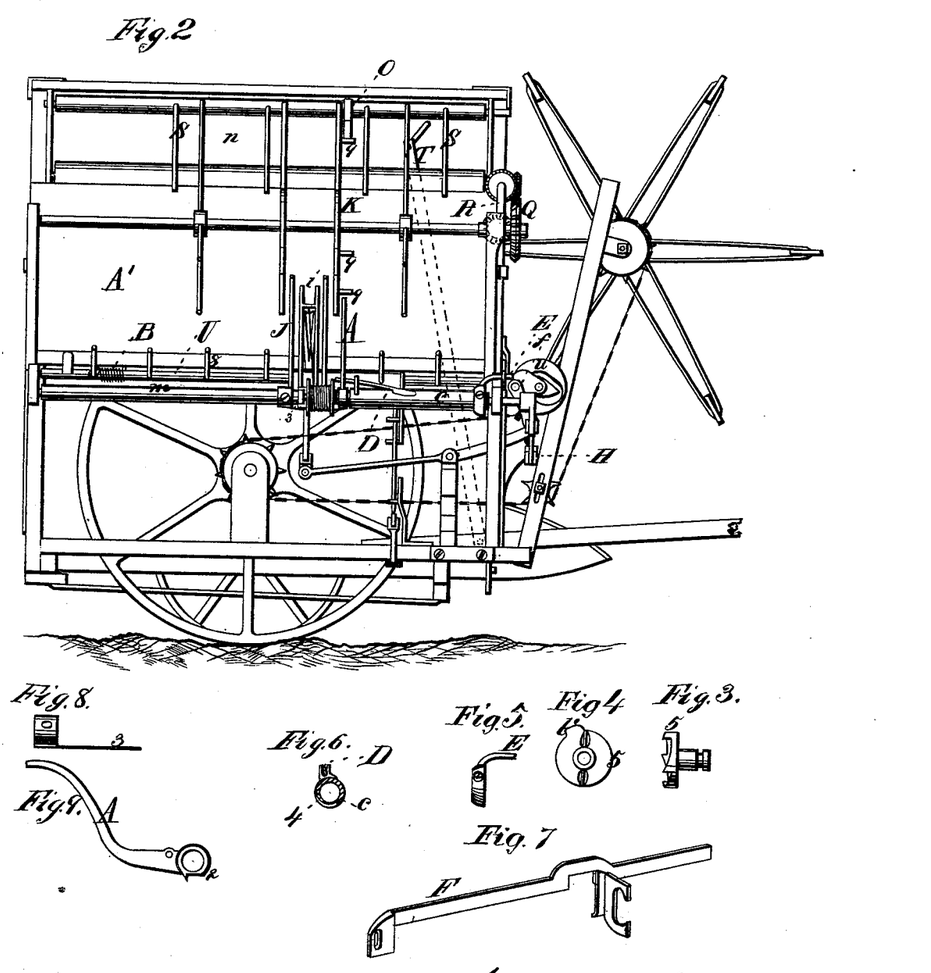
Fig. 2 is an end view of the same.
Figs. 3, 4, 5, 6, 7, 8, 9, 10, 11, 12, 13, 14, and 15 are detail views.
Figures 10, 11, 12:
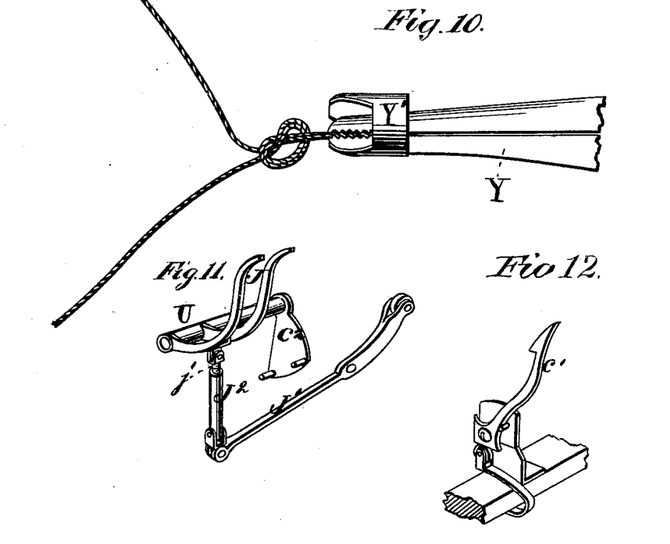

As shaft G (shown in Fig. 1) rotates with the crank-pin on this shaft it brings up the toggle-levers H and L, giving a motion to the shaft *m* that lifts the binding-arm *i*, allowing latch 3 to enter the catch 4, Fig. 6, which, through bar F, throws a clutch, 5, out of gear from the chain-wheel on the shaft G, allowing said wheel to run as an "idler" until enough grain is elevated and deposited into the receiver *n* to lift the fingers S high enough to disengage catch-arm O from its pin on one of the divider-arms P, when the weight of grain will cause said arm to descend until the mutilated spur-wheel Q with its cogs comes in contact with the teeth of a beveled pinion, e, on the short shaft R, which forces a divider-arm, P, with its load of grain one-third way around, delivering the grain on top of the supporting-fingers 8 and into the compressing-arms J which spring from the shaft U, to which fingers 8 are secured, the free ends of which arms may be curved outward, as represented in Fig. 11.

Each divider-arm P, in its rotation, moves the starting-bar A, thus lifting the spring-latch 3 and transmitting motion through the bar F, that draws the clutch 5 into contact with the chain-wheel G', heretofore referred to, giving motion to the knot-tying and binding devices hereinafter explained, the grain being delivered beneath the fingers S into the receptacle formed by the dividing-fingers, shown in Fig. 1. The object of the fingers S is to measure the bundles of grain and have them all of an equal bulk, whether the grain in the field be thick or thin.

The wheel Q, which I have above denominated a mutilated spur-wheel, has its teeth omitted at three points, equidistant from each other, so that when a dividing-arm, P, is locked by the latch-arm O, on the shaft of the teeth S, the shaft R, with its pinion, can rotate freely, without rotating wheel Q, until the grain accumulates under the fingers S, lifting these fingers and the latch-arm O, so as to unlatch divider-arm P and cause the weight of the gathered grain under fingers S to press on dividing-arm P, carrying it down, with its shaft and turning wheel Q, until the pinion on shaft R engages with the teeth on said wheel, causing this wheel to turn until the pinion on shaft R moves the dividing-arms P, so that they change places, pressing the straw, that was previously under the fingers S, down into a receptacle composed of another set of fingers, designated by 8, also onto the compressing-arms J, above referred to. During the rotation of the divider-arms P the studs or anti-friction rollers, designated by 9, near the extremities of said arms, operate on the end of starting-arm A, on shaft m, heretofore described, thereby causing clutch 5 on shaft G to engage with the chain-wheel G', thus setting the binding devices in motion for compressing and tying a bundle of grain. As the binding-arm i descends with the cord or string, and passes over the bundle of grain, the shield or divider K moves forward, pushing all loose grain in front of it, allowing the binding-arm to enter it at the top, free of all obstructions. A shield or hood, K', is fastened on a grain-board, A', just above the divider K, which will assist the arms P in dividing the grain preparatory to the descent of the binding-arm i, so as to leave a space for the descent of the free end of this arm.

In practice I shall construct the main shafts of the binding apparatus tubular, for the purpose of preventing undue vibration, which would take place if solid shafts were used, owing to the sagging caused by the weight of the same. By using tubular shafts I obtain lightness and all the required degree of strength, and avoid the objection referred to.

T designates a grain-guide, which is pivoted at the lower front corner of the elevator-frame, on the grain side thereof, and which is provided at its upper end with a handle convenient to the driver sitting in his seat.

When cutting tall grain the grain-guide T is not used; when cutting short grain, in order that it may be bound at or near the middle of its length, the driver moves the upper end of this grain-guide T backward against the butts of the straw, so that the elevator will deliver the short grain into the receptacle n in a position to be properly bound by the devices I am now about to describe.

Figure 16:
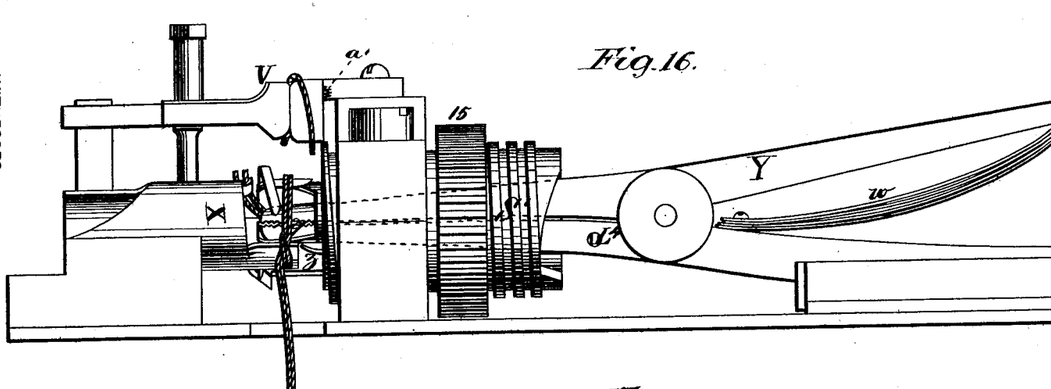
Fig. 16 is a plan view of the binder.
Figure 17:
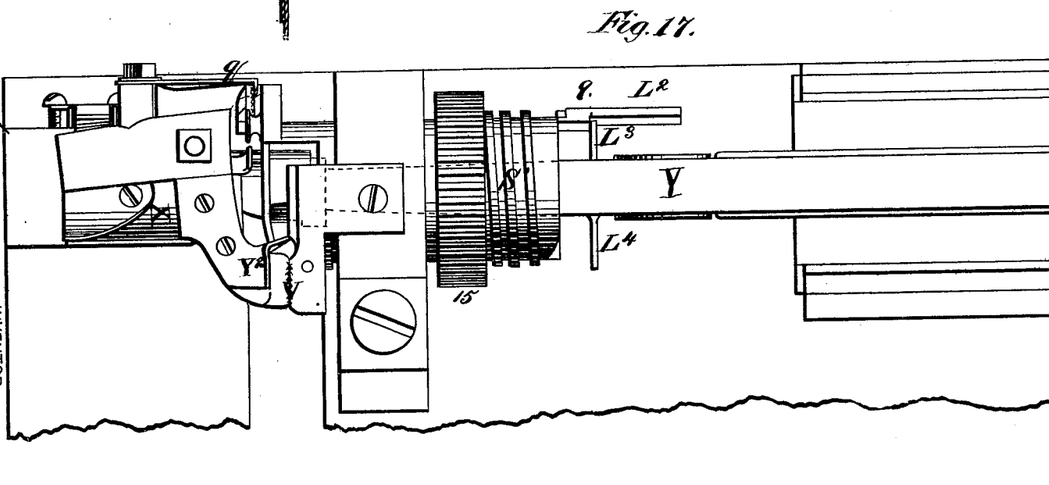
Fig. 17 is a front elevation of the same.
Figure 18:
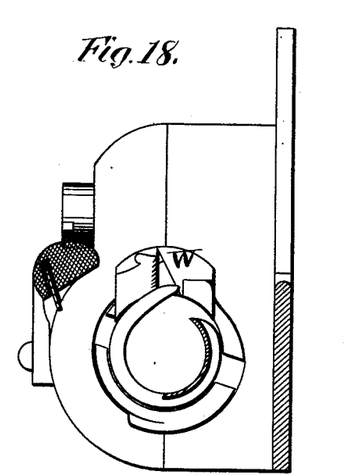
Figs. 18 and 19 are details.
Figure 19:
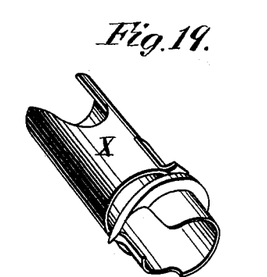

These devices consist, first, of rotating gripers; second, of a stationary tube, which is adapted to serve, in combination with the said rotating gripers, as a means for taking up the slack cord around the bundle of grain, and, at the same time, for holding the cord in a position to be grasped by reciprocating gripers, which operate to finish the knot; third, of elongated gripers, which enter the center of the cylinder of the rotating gripers and into the end of the slotted tube, as indicated by dotted lines in Figs. 16 and 17.

Binding-arm i is threaded by passing the cord over the top of said arm through eyelet t, thence through eyelet t', and finally through a hole made through the free extremity of said arm.

I do not limit myself to the manner herein described and represented for threading the arm i, as other suitable means may be adopted.

Figure 20:
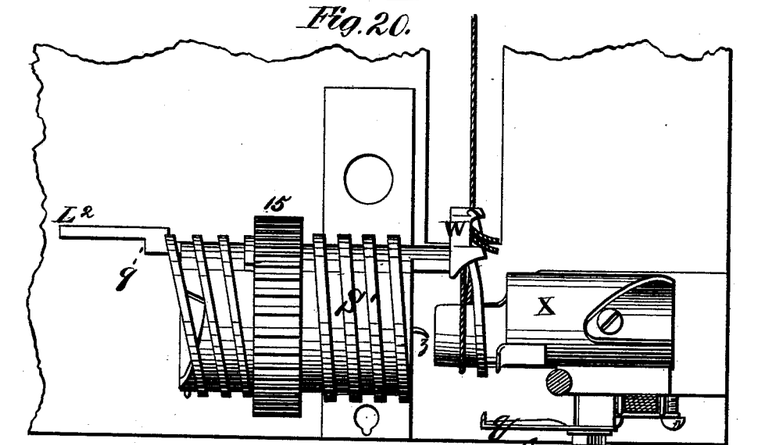
Fig. 20 is a side view, of the binder.
Figure 24:
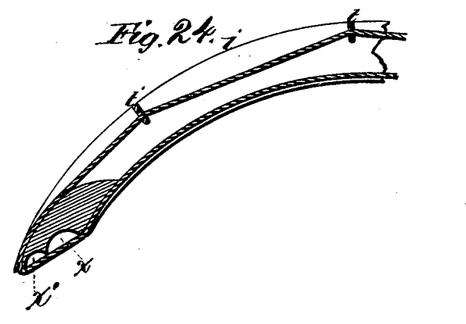
Figures 25, 26:
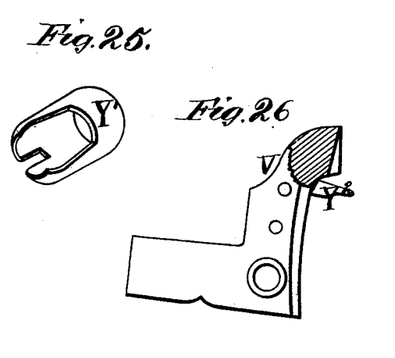

From the free end of arm i the cord is carried down to the knot-tying devices into a pair of griping-jaws, V. As the binding-arm lifts, it carries the cord up and between the rotating jaws W, operated as will be hereinafter described, and as the grain is pressed in from the front of the binding-arm, forcing the straw back into the circle of arm i, leaving the cord around the bundle, one end being fast in the gripers W, the other end passing over the top of the arm i to the spool or ball of cord. The arm i passes down over the bundle with the cord, on the under side of this arm, as seen in Fig. 24, until the point thereof extends through the knot-tying devices, stopping with the point even with the lower side of the gripers V, bringing the cord on the lower side of said arm also into the gripers W. These gripers, now having the cord lying across their jaws twice, close on the cord, and commence to rotate. The gripers W, rotating in the circle of the arm i at x, carry the two ends of the cord about once and a half around the end of the tube X, always stopping with the two ends of the cord across the slotted portion of the tube, so that both ends of said cord are across the center of said tube. The elongated gripers Y (open)

now enter the end of the tube X, and close on the cord lying across the center of said tube. The gripers now recede and pull the ends of the cord through the center of the tube X, and, finally, the cord (double) slips off the end of the tube, thereby producing what is known as a loop-knot. (Represented in Fig. 10.) To draw up this knot as it slips off the end of tube X onto a shield, Y$^1$, the gripers, still receding, tighten the knot over a horn, z. (Shown in Figs. 16 and 20.) After the knot is drawn tight the gripers open and release the bundle, so that it may fall to the ground. As the arm i descends through the knot-tying devices, the smallest concave $x'$, near the point of the arm, just passes over the gripers V, when the jaws or gripers W rotate and close, so as to grab the double cord, when gripers V open, and then shut on the cord drawn straight from the free end of arm i across the small concave $x'$ on the under side of the binding-arm i, near its point, as above referred to. After this operation the rotating jaws complete their revolution, carrying the cord across a knife, Y$^2$, that is held fast on gripers V, which relieves the cord from arm i, the arm i still being threaded, the gripers V having caught the cord in the point of the arm, and rotating jaws W having caught the cord in the concavity $x'$ on the under side of arm i, and cut it off above where the gripers V hold it, thus enabling the machine to repeat the operation of binding without losing hold on the cord.

Figure 27:
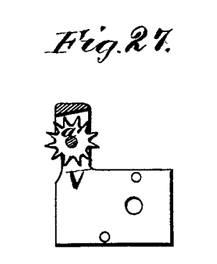
Figure 28:
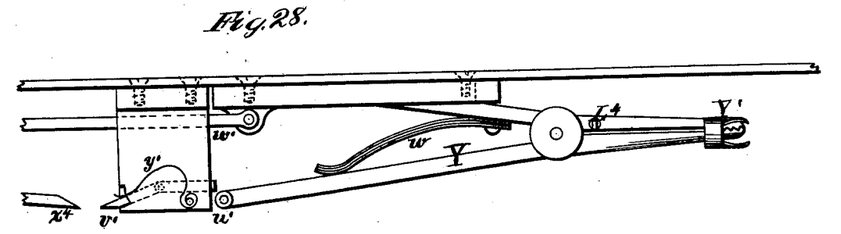
Figs. 28 and 29 show means for actuating the binding and tying devices.

A spur-wheel, $a'$, is inserted into one of the jaws of the gripers V, as represented in Figs. 16 and 27, so that as the cord passes into these gripers it will move this wheel one or two teeth at a time, thereby clearing the griping-faces of the jaws of any foreign material that may lodge therein. The cord also passing down on one side of a tooth, and up on the other side of the same, the wheel aids in retaining the cord in place between the jaws.

Figure 13:
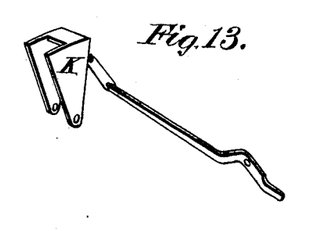
Figure 14:
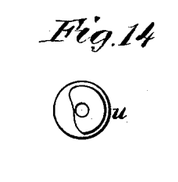
Figure 15:
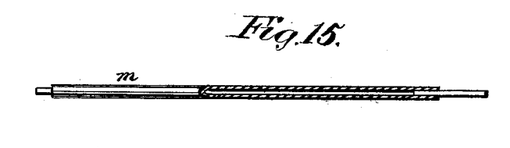

The shield or divider K, represented in Figs. 1 and 13, is operated by means of a lug or cam, $b'$, on the periphery of the clutch 5.

Fingers 8 are operated by means of the weight of grain, which depresses them after the bundle is tied, allowing the bundle to pass off the said fingers and be discharged from the machine.

Helical spring B lifts the fingers, after the discharge of a bundle, into a proper position for receiving a sufficient quantity of grain to form another bundle. Said spring also lifts simultaneously the compressing-arms J into their proper places. Catch-lever $c^1$ hooks on a pin fastened into a segment, $c^2$, which holds the compressing-arms stationary and in a position to receive the grain for the next bundle.

The compressing-arms J are preferably constructed so as to be separate, or, if solid, they should be constructed concave laterally, so as not to bind the cord against the bundle of grain, which would, if the arms were solid, prevent the rotating jaws W from taking up the slack cord about the bundle while it is being compressed. The binding-arm i is also preferably made of a skeleton form, for the reason above stated in reference to the compressing-arms J. If said arm i is made solid, it must be constructed with a concavity to receive the cord.

Fig. 11 shows the compressing-arms J and their connection with spring-lever J$^1$. Lever J$^1$ is made of steel, and the longest arm of it is reduced in size, so that it will yield during the operation of the arms J in compressing a bundle. The connection of said arms with their spring-lever J$^1$ is made by a rod, J$^2$, which is adjustable endwise by means of a screw-section, j. My object here is to adjust the compressing-arms J for bundles of different sizes.

The link-and-lever movement H and L, which I have above denominated toggle-levers, is so adjusted that when the link f is at its lowest stroke it brings said levers H and L down past a horizontal plane, so that these levers, descending below said plane and rising above the same, hold the free end of the arm i down in the knot-tying devices a sufficient length of time to allow the bundle to be compressed and the knot to be finished.

During the operation of the arm i it compresses the upper portion of the bundle, holding down the grain thereof while the lower arm J compresses the under side of the bundle.

It will be observed, by reference to the drawings, that the arms i and J are segments of a circle, so that when the bundle is compressed by them it is cylindrical, and will remain tightly bound when detached from the tying devices.

I have represented in Fig. 1 two anti-friction rollers, l l, which are applied to a bracket secured to the inner reel-post M, the object of which is to diminish the friction on the reel-shaft N, and thereby enable me to use a single reel-chain, p, of common construction, to perform the work, not only of reeling in the grain, but also the work of compressing and tying the bundles of grain. More than one reel-chain may be used, if desired.

I do not claim, broadly, anti-friction rollers for supporting a shaft in a harvesting-machine, as this is old and well known. I locate my rollers l l on the inner reel-post, and arrange them in such manner that during the operation of reeling in the standing grain they will prevent undue friction on the reel-shaft.

Figures 21, 22:
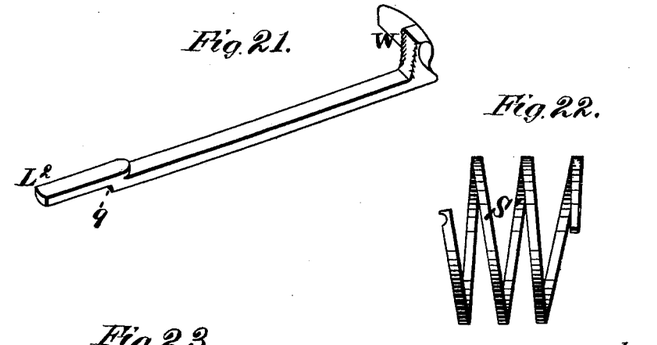
Figs. 21, 22, 23, 24, 25, 26, 27 are detail views thereof.
Figure 23:
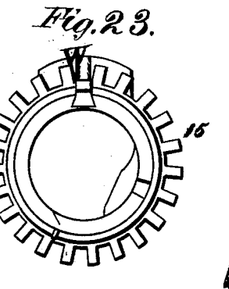

On Sheet 7 I have represented a method for connecting the knot-tying devices with the cam-wheel u. The letter $w'$ designates a connecting-rod working the gripers Y. As these gripers reciprocate endwise they carry an anti-friction roller, $w'$, (which is at the extremity of one of the arms of the gripers,) on the lower side of a guide, $v^1$, on their back stroke. The forward stroke of these gripers brings the roller $w'$ on the upper side of the guide $v^1$, opening the jaws of the gripers to receive the cord in their passage into the tube X. These gripers pass into the tube X just far enough to grab the cord, and when the cord is seized the gripers continue the forward stroke until the lug $L^3$ strikes the shoulder 9, (shown clearly in Figs. 17, 20, and 21,) moving the jaw W until it hooks on a catch, $q$. When the roller $u'$ gets past the guide $v^1$ spring $w$ exerts its force on the gripers Y to seize the cord, as the gripers Y retreat to finish the knot. But in the back stroke of the gripers Y they retreat just far enough to pull up the knot tightly, at which time the roller $u'$ again comes in contact with an inclined guide, $x^4$, that opens the jaws of the gripers and releases the cord. Guide $v^1$ is constructed with a pivoted section, the beveled end of which is free to vibrate, for the purpose of allowing roller $u'$ to pass on its upper side as the gripers commence their forward stroke.

Figure 29:
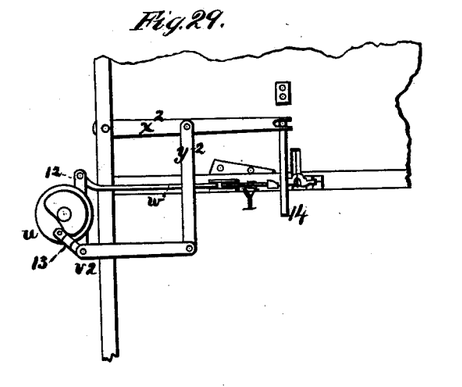
Figure 30:
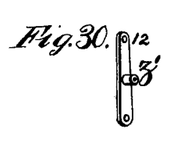
Figs. 30, 31, 32, and 33 are details.
Figure 31:
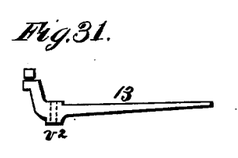
Figure 32:
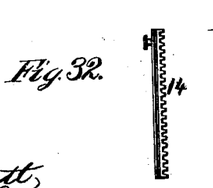
Figure 33:
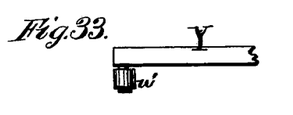

The light spring designated by the letter $y^1$ is intended to keep the pivoted section of the guide down in its place. One end of rod $w'$ is pivoted, in a suitable manner, to the gripers Y. The other end of this rod $w'$ is pivoted to the upper arm of a lever, 12, shown in Figs. 29 and 30. The lower end of lever 12 is pivoted to the frame of the machine. At or near the center of lever 12 is an anti-friction roller, $z'$, which is acted on by a cam-groove of wheel $u$, so as to give the upper end of said lever 12 a vibratory motion that is transmitted to the gripers Y.

On the opposite face of cam-wheel $u$, and actuated by the cam-wheel, is a lever, 13. This lever is pivoted at $v^2$, and its free end is pivoted to a connecting-rod, $y^2$, that gives a vertical reciprocating motion to a rack, 14, through the medium of an arm, $x^2$, which rack gives motion to the pinion 15 on the cylinder which carries the rotating jaws W.

As the gripers Y recede, rack 14 reaches its upward stroke, which turns pinion 15 about once and a half around, thereby bringing the gripers W into position to receive the cord from the arm $i$ preparatory to binding another sheaf. Gripers Y then start forward, engaging lug $L^4$, with the tang $L^2$ opening the rotating jaws W, and holding them open until the cord has been passed twice between them by the binding-arm $i$, at which time they begin to rotate, thereby releasing tang $L^2$ from stud $L^4$, and allowing the spring $S'$ to close the rotating jaws W.

As the jaws W commences to rotate, the cord is brought across the stationary knife $Y^2$, which severs the cord held by jaws W from the cord held by gripers V.

It will be observed, from the above description, that the gripers V seize and hold the cord previous to the operation of the arm $i$ in delivering the cord to the tying devices, and when gripers W commence to rotate with the double cord around the tube X, and just before they reach the stationary knife $Y^2$, a stud or roller on the side of rack comes in collision with the movable jaw on the gripers V, opening those gripers just enough to catch the cord before the jaws W reach the stationary knife that severs the string from the gripers V.

Other devices may be employed for opening the gripers V; but I now preferably employ the device above described.

What I claim, and desire to secure by Letters Patent, is—

1. Rotating jaws or cord-holders W, combined with a stationary transversely-slotted tube, X, and the rectilinear reciprocating gripers Y, substantially as described.

2. Rotating jaws or cord-holders W, combined with a slotted tube, X, rectilinear reciprocating gripers Y, and horn $z$, substantially as described.

3. A knife, $Y^2$, combined with rotating jaws W and cord-holding gripers V.

4. The spurred wheel $a'$, combined with the cord-holding jaws V, and so constructed that it will assist in holding the cord without cutting the same, and at the same time clearing the jaws, substantially as described.

5. A shield, $Y^1$, of tubular form, rigidly secured to one of the jaws of the gripers Y, substantially as described.

6. Gripers Y, a tubular shield, $Y^1$, on one of the jaws on said gripers, a horn, $z$, and rotating gripers W combined, whereby the knot is tightened, substantially as described.

7. A curved vibrating, compressing, and cord-carrying arm, $i$, of curved form, recessed at $x$ $x^1$, and combined with cord-griping jaws W and gripers Y, substantially as described.

8. A vibrating divider, K, in combination with a vibrating cord-carrying arm, $i$, for the purpose described.

9. In combination with a vibrating divider, K, a hood, $K'$, arranged over it, for the purpose set forth.

10. In combination with one or more rigid compressing-arms J and flexible supporting-fingers 8 on shaft U, the cord-carrying arm $i$, substantially as described.

11. A spring-lever, $J^1$, combined with the compressing-arms J, for the purpose set forth.

12. In combination with the compressing-arms J and a lever, $J^1$, an endwise-adjustable connecting-rod, $J^2$, for the purpose described.

13. Latch 3, starting-bar A, catch 4, tube $c$, bar $m$, in combination with a clutching device on the shaft G, for the purpose described.

14. The rigid compressing-arms J and shaft U, in combination with the light flexible fingers 8 and spring B, substantially as described, and for the purpose set forth.

15. In combination with a lifting device for measuring the grain, a tripping-arm, O, and intermittently-rotating fingers P, substantially as described.

16. Intermittently-rotating dividing-arms P, in combination with a divider, K, and a cord-carrying arm, $i$, substantially as described.

17. Intermittently-rotating dividing-arms P, in combination with a hood, $K'$, and a vibrating divider, K, substantially as described.

18. The combination, with the toggle-levers

H and L and link $f$, of the compressing and cord-carrying arm $i$, substantially in the manner and for the purpose described.

19. An adjustable grain-guide, T, combined with a grain-elevator in a harvester, substantially as described.

20. In combination with a catch, $q$, the rotating jaw W, for the purpose described.

21. In combination with the switch $v^1$, the gripers Y, provided with the anti-friction rollers $u'$, for operating the jaws of the gripers, substantially as described.

In testimony that I claim the above I have hereunto subscribed my name in the presence of two witnesses.

GEORGE F. GREEN.

Witnesses:
 JOHN F. ACKER,
 C. H. McEWEN.